(12) United States Patent
Asprion et al.

(10) Patent No.: US 7,485,275 B2
(45) Date of Patent: Feb. 3, 2009

(54) METHOD FOR REMOVING ACID GASES AND AMMONIA FROM A FLUID STREAM

(75) Inventors: Norbert Asprion, Ludwigshafen (DE); Ute Lichtfers, Karlsruhe (DE); Christoph Großmann, The Woodlands, TX (US)

(73) Assignee: BASF SE, Ludwigshafen (DE)

( * ) Notice: Subject to any disclaimer, the term of this patent is extended or adjusted under 35 U.S.C. 154(b) by 291 days.

(21) Appl. No.: 11/457,199

(22) Filed: Jul. 13, 2006

(65) Prior Publication Data

US 2007/0020163 A1   Jan. 25, 2007

(30) Foreign Application Priority Data

Jul. 20, 2005  (DE) .................. 10 2005 033 837

(51) Int. Cl.
| | |
|---|---|
| *B01D 53/40* | (2006.01) |
| *B01D 53/52* | (2006.01) |
| *B01D 53/54* | (2006.01) |
| *B01D 53/58* | (2006.01) |
| *B01D 53/62* | (2006.01) |

(52) U.S. Cl. .................. 423/220; 423/228; 423/236; 423/237; 423/242.1; 423/242.7

(58) Field of Classification Search .............. 423/220, 423/228, 236, 237, 242.1, 242.7
See application file for complete search history.

(56) References Cited

U.S. PATENT DOCUMENTS

| | | | |
|---|---|---|---|
| 4,073,862 A | * | 2/1978 | Haese .................. 423/220 |
| 4,088,735 A | * | 5/1978 | Bratzler et al. .............. 423/219 |
| 4,537,753 A | | 8/1985 | Wagner et al. |
| 4,551,158 A | | 11/1985 | Wagner et al. |
| 4,553,984 A | | 11/1985 | Volkamer et al. |
| 5,672,326 A | * | 9/1997 | Minak et al. ................ 423/224 |

FOREIGN PATENT DOCUMENTS

| | | |
|---|---|---|
| DE | 100 28 637 | 12/2001 |
| EP | 0 121 109 | 10/1984 |
| EP | 0 159 495 | 10/1985 |
| EP | 0 190 434 | 8/1986 |
| EP | 0 202 600 | 11/1986 |
| EP | 0 359 991 | 3/1990 |
| WO | WO-01/00271 | 1/2001 |

* cited by examiner

*Primary Examiner*—Timothy C Vanoy
(74) *Attorney, Agent, or Firm*—Connolly Bove Lodge & Hutz LLP

(57) ABSTRACT

A method is provided for removing acid gases and ammonia from a fluid stream in which a fluid stream comprising acid gases and ammonia is brought into contact with an aqueous absorption medium. The fluid stream is depleted of acid gases and ammonia and the absorption medium stream, which is charged with acid gases and ammonia, is regenerated in a desorption step. The acid gases and the ammonia are stripped out of the absorption medium and the condensable fractions thereof are condensed. A condensate and also a purified absorption medium stream are obtained. The condensate is ejected in part or completely from the desorption step, or feed in part or completely to a distillation column in which ammonia is separated off overhead as an aqueous solution or in the pure state. A aqueous bottom stream is obtained which is recycled to the absorption step or the desorption step.

17 Claims, 1 Drawing Sheet

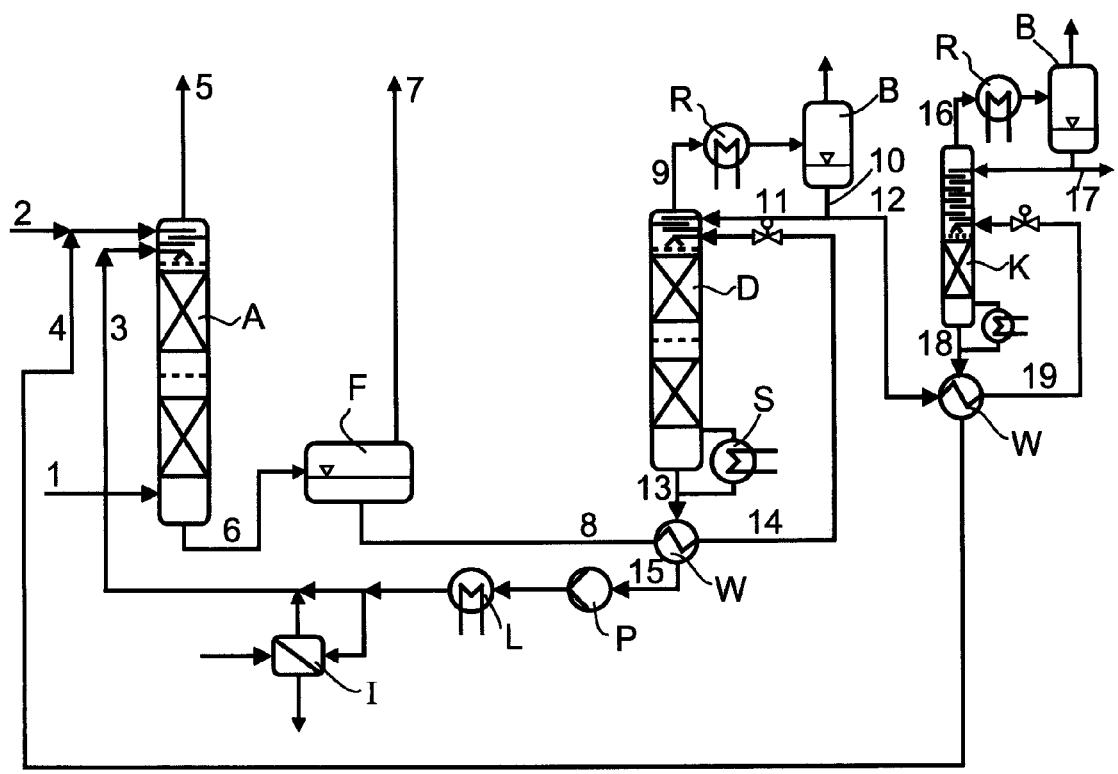

METHOD FOR REMOVING ACID GASES AND AMMONIA FROM A FLUID STREAM

CROSS REFERENCE TO RELATED APPLICATIONS

This non-provisional application claims priority under 35 U.S.C. § 119(a) on Patent Application No. 102005033837.2 filed in Germany on Jul. 20, 2005, the entire contents of which are hereby incorporated by reference.

DESCRIPTION

The present invention relates to a method for removing acid gases and ammonia from a fluid stream.

In numerous processes of the chemical industry, fluid streams occur which comprise acid gases, for example $CO_2$, $H_2O$, $H_2S$, $SO_2$, $CS_2$, HCN, COS or mercaptans as impurities. These fluid streams can be, for example, gas streams (such as natural gas, synthesis gas or heavy oil or heavy residues, coke-oven off-gases, refinery gas or reaction gases formed in the partial oxidation of organic materials, for example coal or mineral oil) or liquid or liquefied hydrocarbon streams, such as LPG (liquefied petroleum gas) or NGL (natural gas liquids). Before these fluids can be transported or further processed, the acid gas content of the fluids must be markedly reduced. $CO_2$, for example, must be removed from natural gas, since a high concentration of $CO_2$ reduces the calorific value of the gas. Furthermore, $CO_2$, in combination with the water frequently entrained in fluid streams can lead to corrosion on pipes and fittings.

The removal of sulfur compounds from these fluid streams is important for various reasons: for example, the sulfur compound content of natural gas must be reduced by suitable treatment measures immediately at the natural gas source, since the sulfur compounds, together with the water frequently entrained by natural gas, also form acids which act corrosively. For the transport of the natural gas in a pipeline, therefore preset limit values of the sulfurous impurities must not be exceeded. Furthermore, numerous sulfur compounds, even at low concentrations, are foul-smelling, and, in particular hydrogen sulfide, toxic.

Furthermore, fluid streams from processes in the chemical industry can additionally also comprise ammonia as unwanted component. Ammonia must also be eliminated therefrom, because it can lead to problems in product quality in the methods in which the fluid streams are used. Ammonia is, for example, a catalyst poison for Fischer/Tropsch catalysts. Residue ammonia contents also influence, in particular by reaction with the acid gases, the residue loading with the same. It is known to remove the unwanted acid gas constituents from the fluid stream, in particular by gas scrubbing using an aqueous absorption medium, aqueous solutions of primary, secondary and tertiary aliphatic amines or alkanolamines such as monoethanolamine (MEA), diethanolamine (DEA), monomethylethanolamine (MMEA), diethylethanolamine (DEEA), triethanolamine (TEA), diisopropanolamine (DIPA) and methyidiethanolamine (MDEA) being preferred. Particular preference is also given to mixtures of tertiary and primary and/or secondary amines, for example mixtures of MDEA and DEA, of MDEA and MMEA, or of MDEA and piperazine.

When the fluid stream to the gas scrubbing, as in the present case, in addition to the acid gases, also comprises ammonia, the level of this increases in the absorption medium and in addition, it also markedly impairs the residue loading of the absorption medium with acid gases.

In known methods the ammonia-comprising fluid stream is therefore passed through an upstream ammonia scrubber for separating off the ammonia.

It was therefore an object of the invention to modify the known method for separating off acid gas components by absorption using an aqueous absorption medium simply and inexpensively in a manner such that, in addition, the removal of ammonia is also possible.

This object is achieved by a method for removing acid gases and ammonia from a fluid stream, according to which 1. in an absorption step the fluid stream comprising the acid gases and ammonia is brought into contact with an aqueous absorption medium, obtaining a fluid stream which is depleted of acid gases and ammonia, and also an absorption medium stream which is charged with acid gases and ammonia and
2. is regenerated in a desorption step, the acid gases and the ammonia being stripped out of the absorption medium and the condensable fractions thereof condensed, obtaining a condensate and also a purified absorption medium stream, which comprises ejecting in part or completely the condensate from the desorption step, or feeding it in part or completely to a distillation column in which ammonia is separated off overhead as aqueous solution or in the pure state and an aqueous bottom stream is obtained which is recycled to the absorption step or the desorption step.

It has surprisingly been found that it is possible to separate off simultaneously acid constituents and ammonia from a fluid stream by absorption using an aqueous absorption medium by, at a suitable point in the method, ejecting stream from the method or feeding it to a work up by distillation for separating off ammonia which is lower by the factor 20 to 100 compared with the aqueous bottom stream from the desorption step which is recycled to the absorption step.

Fluid is taken to mean, as is customary, all liquids, vapors or gases which obey the flow laws of non-solid continua.

The fluid streams used in the present method comprise, as acid gas components, in particular carbon dioxide and/or hydrogen sulfide. In addition, fluid streams can also be used which, as acid gas to be removed, comprise prussic acid (HCN).

The fluid stream can in addition comprise further acid gas components, in particular COS, mercaptans, $SO_3$, $SO_2$ or $CS_2$. In addition, further inert gas components can be present which are not absorbed by the aqueous absorption medium to a significant extent, in particular volatile hydrocarbons, particularly $C_1$- to $C_4$-hydrocarbons, such as methane, in addition nitrogen and hydrogen.

The fluid stream which is rich in acid gas components and additionally comprises $NH_3$ is, in an absorption step in an absorber, brought into contact with an aqueous absorption medium, as a result of which the acid gas components are at least in part scrubbed out.

As absorber, use is preferably made of a scrubbing apparatus used in customary gas scrubbing methods. Suitable scrubbing apparatuses are, for example, dumped packaging columns, ordered packing columns and tray columns, membrane contactors, radial-stream scrubbers, jet scrubbers, venturi scrubbers and rotary spray scrubbers, preferably ordered packing columns, dumped packing and tray columns, particularly preferably ordered packing columns and dumped packing columns. The fluid stream is preferably treated with the absorption medium in a column in countercurrent flow. The fluid stream in this case is generally fed into the lower region of the column, and the absorption medium into the upper region of the column.

The temperature of the absorption medium is in the absorption step generally about 40 to 100° C., when a column is used, for example, 40 to 70° C. at the top of the column and 50 to 100° C. at the bottom of the column. The overall pressure in the absorption step is generally about 1 to 120 bar, preferably about 10 to 100 bar, particularly preferably about 10 to 60 bar. A product fluid (pure fluid) is obtained which is low in acid gas components and $NH_3$, i.e. is depleted of these components, and an absorption medium which is charged with acid gas components and $NH_3$ is obtained.

The absorption step can comprise one or more, in particular two, sequentially following substeps, the crude fluid comprising the acid gas components and $NH_3$ being brought into contact in each of the substeps in each case with a substream of the absorption medium. The absorption medium with which the crude fluid is brought into contact can already be in part charged with acid gases, i.e. it can be, for example, an absorption medium which has been recirculated from a subsequent absorption step to the first absorption step, or partially regenerated absorption medium. With respect to carrying out the two-stage absorption, the publications EP-A 0 159 495, EP-A 0 20 190 434, EP-A 0 359 991 and WO 00/100271 are hereby incorporated by reference.

According to a preferred embodiment, the inventive method is carried out in such a manner that the fluid stream comprising the acid gases and $NH_3$ is first treated in a first absorption substep with the absorption medium at a temperature of 40 to 100° C., preferably 50 to 90° C., and in particular 60 to 90° C. The fluid which is depleted of acid gases and $NH_3$ is then in a second absorption substep treated with the absorption medium at a temperature of 30 to 90° C., preferably 40 to 80° C., and in particular 50 to 80° C. The temperature in this case is 5 to 20° C. lower than in the first absorption substep.

As aqueous absorption medium, use is made in the present method, in particular, of aqueous solutions of primary, secondary or tertiary aliphatic amines or alkanolamines, in particular monoethanolamine (MEA), diethanolamine (DEA), monomethylethanolamine (MMEA), diethylethanolamine (DEEA), triethanolamine (TEA), diisopropanolamine (DIPA) or methyldiethanolamine (MDEA). Particularly advantageously, as absorption medium, use can be made of aqueous solutions of tertiary amines, in particular alkanolamines, and an amine which is selected from piperazine, hydroxyethylpiperazine, bis(hydroxyethylpiperazine) or a mixture thereof as are described in German patent application DE 10 306 254.8. The tertiary alkanolamine in this case can be a trialkanolamine, alkyldialkanolamine or dialkylalkanolamine. The alkyl groups can be straight chain or branched and generally have one to four carbon atoms. The alkanol groups generally have two to four carbon atoms. Examples of tertiary alkanolamines are: triethanolamine, tributanolamine, diethanolamine, diethylethanolamine, dimethylethanolamine, dimethylpropanolamine, and preferably methyldiethanolamine (MDEA).

Preferably, the absorption medium can also comprise piperazine as additional activator.

Hydroxyethylpiperazine and bis(hydroxyethylpiperazine) are preferably used in a mixture.

The total amine content of the inventive absorption medium is generally in the range from 20 to 70% by weight, preferably 20 to 60% by weight, and in particular 20 to 55% by weight, based on the total weight of the absorption medium.

The absorption medium charged with acid gases and ammonia is then regenerated in a desorption step, the acid gases and the ammonia being stripped out of the absorption medium using a stripping gas, a stripping gas charged with acid gases and ammonia being obtained. The condensable fractions thereof are condensed and the condensate is again fed to the desorption step. From the desorption step, a purified absorption medium stream is obtained which, if appropriate after further work up, is preferably recycled to the absorption step.

The desorption step is carried out, in particular, in a stripper, which is preferably equipped with separating internals, in particular ordered packings, and in which the acid gases and the ammonia are stripped out by steam which is generated in a reboiler.

It is also possible, in addition to the desorption in a stripper, to carry out on the absorption medium stream charged with acid gases and ammonia firstly at least one pressure expansion from a high pressure, as prevails when carrying out the absorption step, to a lower pressure.

The pressure expansion can be performed, for example, by means of a throttle valve and/or an expansion turbine. Regeneration using an expansion stage is described, for example, in the publications U.S. Pat. Nos. 4,537,753 and 4,553,984.

The regeneration step can be performed, for example, in an expansion column, for example a vertically or horizontally installed flash vessel, or a countercurrent flow column having internals. A plurality of expansion columns can be connected serially, in which regeneration is performed at different pressures. For example, regeneration can be performed in a pre-expansion column at high pressure which is typically approximately 1.5 bar above the partial pressure of the acid gas components in the absorption step, and in a main expansion column at low pressure, for example 1 to 2 bar absolute. Regeneration using two to 30 or more expansion stages is described in the publications U.S. Pat. Nos. 4,537,753, 4,553, 984, EP-A 0 159 495, EP-A 0 202 600, EP-A 0 190 343 and EP-A 0121 109.

A method variant having two low-pressure expansion stages (1 to 2 bar absolute) in which the absorption liquid which is partially regenerated in the first low-pressure expansion stage is warmed, and in which, if appropriate upstream of the first low-pressure expansion stage, a medium-pressure expansion stage is provided in which expansion is performed to at least 3 bar, is described in DE 100 28 637. In this case the charged absorption liquid is first expanded in a first low-pressure expansion stage to a pressure of 1 to 2 bar absolute. The partially regenerated absorption liquid is then warmed in a heat exchanger and then, in a second low-pressure expansion stage, again expanded to a pressure of 1 to 2 bar absolute.

The last expansion stage can also be carried out under vacuum which is generated, for example, by means of a steam jet, if appropriate in combination with a mechanical vacuum generation apparatus, as described in EP-A 0 159 495, EP-A 0 202 600, EP-A 0 190 434 and EP-A 0 121 109 (U.S. Pat. No. 4,551,158).

According to the invention, the condensate from the desorption step is in part or completely ejected, or in part or completely fed to a distillation column for separating off ammonia.

The condenser at the top of the stripper is preferably operated at 30 to 70° C., in particular at 40 to 60° C. The resultant condensate predominantly comprises water, in greater than 90% by weight, or else greater than 95% by weight water and the remainder dissolved gases. In the condensate there is, in particular, at least 90% of the ammonia stripped in the desorption step.

The condensate stream from the stripper in the desorption step compared with the aqueous bottom stream from the desorption step which is recycled to the absorption step, a very small stream, depending on operating conditions of the stripper, smaller by a factor of 20 to 50. It can be completely ejected and passed into wastewater.

Preferably, a part of the condensate is applied again to the stripper as reflux, and only the residue fraction, frequently about 10 to 40%, preferably 15 to 30%, of the condensate stream is ejected.

In a further method variant, the condensate stream from the stripper is fed to a distillation column in which ammonia is separated off overhead. In this method variant also, a substream of the condensate stream can be reapplied as reflux to the stripper and the condensate stream in the remainder can be fed to the distillation step for separating off ammonia.

The distillation step for separating off ammonia is carried out in particular in a multistage apparatus having exit part and enrichment part, which apparatus is designed having 5 to 15, preferably having 8 to 12, theoretical plates.

The apparatus can be operated at atmospheric pressure or else at elevated pressure, in the range between 1 and 20 bar absolute. Depending on pressure in the column, via the overhead stream, ammonia can be separated off as aqueous solution, in particular as 20% strength by weight, or 25% strength by weight, aqueous solution, or else, at correspondingly high pressure, pure ammonia can be separated off. In this case, an overhead stream is taken to mean pure which consists of at least 99% by weight, or else of at least 99.5% by weight, ammonia.

In order to achieve the specification requirement for aqueous ammonia solution or pure ammonia suitable as commercial product, it can be necessary first, upstream of the feed to the apparatus for separating off ammonia, to deplete the feed stream of acid constituents by precipitating same by setting the pH, in particular to a pH of about 11, for example by adding sodium hydroxide solution or potassium hydroxide solution. In this method variant, however, the corresponding salts occur in the bottom stream of the distillation column for separating off ammonia, so that this is generally not recycled to the method.

According to the invention, a preferred method variant is also provided which is particularly suitable for purifying fluid streams which additionally comprise prussic acid. According to this preferred method variant, the prussic acid (HCN) is hydrolyzed upstream of the feed into the desorption step. In this case the prussic acid is to be substantially, that is at least 50%, hydrolyzed. It is possible to carry out the hydrolysis of the prussic acid as disclosed by the prior art, for example WO 2004/105922, in a reactor having a fixed-bed catalyst upstream of the gas scrubbing using aqueous amine solution. Preferably, the hydrolysis of the prussic acid, however, is carried out in a dwell time vessel which is arranged between the absorption step and the desorption step and which is constructed in particular as bottom of a flash apparatus.

In this case, in a known manner, as flash apparatus, an apparatus is denoted in which a flash distillation, also expansion distillation or equilibrium distillation, is carried out. A liquid mixture is expanded here from the boiling state and without external supply or removal of heat into a vapor-liquid separator or into a rectification column.

Advantageously, the dwell time of the absorption medium stream in the dwell time vessel is set in the range between 5 and 40 min, in particular between 10 and 30 min, further preferably between 15 and 25 min.

In a further preferred method variant, the purified absorption medium stream taken off via the bottom from the desorption step is depleted by reclaiming of organic acids which are present in the fluid stream or which form in the absorption step or in the desorption step. The reclaiming of amines is a known method according to which a small substream, customarily 0.5 to 2% of the total stream, is taken off and fed to a steam-heated or directly heated kettle which is generally operated at the same pressure as the distillation column for the amine. By reboiling, high-boiling organic compounds, salts or, as in the present case, organic acids, can be concentrated in the reclaimer kettle, the amine leaving the kettle purified, in vapor form. Suitable methods for the present method are the known reclaiming methods for amines, in particular thermal reclaiming, reclaiming by ion exchange or by electrodialysis, as described, for example, in A. Kohl and R. Nielsen: Gas Purification, Gulf Publishing Company, 1997, 5th Edition, pages 255 to 265.

In a further advantageous embodiment variant, the desorption step is carried out at elevated pressure, in particular in the range between 2.5 and 10 bar absolute, preferably between 2.5 and 7 bar absolute, further preferably between 4 and 7 bar absolute, the acid gases, for example carbon dioxide, being obtained at elevated pressure and which, owing to this elevated pressure, can be recycled to a reforming method with a decreased compression requirement.

By means of the inventive method, pure fluids having a very high specification requirement with respect to acid gases and ammonia can be obtained in a plant which, compared with known plants, is substantially smaller, or in exchange substantially smaller streams need to be ejected in comparison with known methods.

For instance, in known methods for removing the ammonia upstream of the gas scrubbing for removing the acid components by absorption in an amine solution, more precisely by separate ammonia-water scrubbing or ammonium-sulfate-scrubbing (absorption of ammonia in aqueous sulfuric acid solution), a significantly greater apparatus (apparatus diameter 7.5 m, 8 to 9 m of separating internals, necessity to work under pressure) is required, compared with the ammonia distillation apparatus used according to the invention which, for the same separation task, at likewise 8 to 9 m of separating internals, has a diameter of only 0.25 m and is not designed as pressure apparatus, but is operated at atmospheric pressure.

The hydrolysis of prussic acid in a fixed-bed reactor which is upstream of the scrubbing of acid components in known methods likewise requires a large apparatus since the entire gas stream to be treated must be passed through this apparatus. In contrast, this apparatus can be dispensed with in the method according to the invention.

Owing to the same separation task being able to be achieved using smaller apparatuses or smaller material streams, correspondingly, also, the capital and operating costs are significantly lower.

The invention will be described in more detail hereinafter with reference to a drawing and an example:

BRIEF DESCRIPTION OF THE DRAWING

In the single FIGURE, a method diagram is shown for a preferred plant of the method according to the invention.

DETAILED DESCRIPTION OF THE PREFERRED EMBODIMENT

To an absorber A are fed in counter-current flow to one another, in the lower region, a fluid stream 1 to be purified, and in the upper region of same an absorption medium stream comprising freshly added water (stream 2), and also the back-streams 3 and 4. The absorption medium comprising an aqueous amine solution is fed on start-up of the plant in the upper region of the absorber A (not shown in the FIGURE); losses of amine in the course of the method are supplemented via the back-stream 3 from the desorption step into the absorption step.

From the absorber A, a fluid stream 5 which is depleted of acid gases and ammonia is taken off from the upper region of same, and from the bottom an absorption medium stream 6 which is charged with acid gases and ammonia is taken off which is introduced into a flash apparatus F which simultaneously acts as dwell time vessel for the hydrolysis of prussic acid.

From the flash apparatus is taken off a flash gas stream 7, and also a bottom stream 8 comprising charged absorption medium. The stream 8 is passed via a heat exchanger W and then, as stream 14, is applied to the stripper D used in the desorption step. The stripper D is equipped with a reboiler S. Overhead is taken off a stream 9, its condensable fractions are condensed in the reflux condenser R and passed to the vessel B. From the vessel B is taken off a stream 10 which is applied in part as reflux 11 back to the stripper D and the remainder, as stream 12, is fed to a distillation column K for separating off ammonia. From the distillation column K is taken off an overhead stream 16 which is fed to a reflux condenser R and the condensate therefrom is fed to a further storage vessel B from which a stream 17 comprising an aqueous ammonia solution is taken off. In the preferred embodiment variant shown in the FIGURE, a substream is fed from the storage vessel B from which a stream 17 comprising an aqueous ammonia solution is taken off. In the preferred embodiment variant shown in the FIGURE, a substream from the storage vessel B is again applied to the column K as reflux. Stream 12 is passed via a heat exchanger W and applied as stream 19 to the column K for separating off ammonia.

The bottom stream 18 from the column K is passed via the heat exchanger W and then, as stream 4, recycled to the absorber A.

In a plant corresponding to the illustration in the FIGURE having an absorber having a diameter of 8 m which was operated at a pressure of 34.5 bar absolute, as fluid stream 1 to be purified, a crude gas stream of 61 700 kmol/h having 12% by volume carbon dioxide, 10 ppm by volume ammonia and 10 ppm by volume prussic acid was introduced into the lower region of same at a temperature of 30° C.

In counter-current flow thereto, the back-stream 3 of 4060 t/h of a 45% strength activated MDEA solution as absorption medium was applied at a temperature of 50° C. to the upper region of the absorber below the top separation stage.

Above the top separation stage were fed 15.9 t/h of fresh water (stream 2) at 40° C.

From the top of the column, at 51° C. the pure gas stream 5 was taken off which comprised a very substantially purified gas having only less than 5000 ppm by volume carbon dioxide, less than 150 ppb by volume of ammonia and less than 50 ppb by volume of prussic acid.

The bottom stream 6 was taken off at 78° C.

The stripper D used in the desorption step had a diameter of 9 m and in total 10 theoretical plates and was operated at a pressure of 1.4 bar absolute.

From the stripper D was taken off at 81° C. an overhead stream 9 of 374.2 t/h, of which 64.5 t/h was water, 309.6 t/h carbon dioxide and 59.4 kg/h ammonia. The overhead stream 9 was fed to a reflux condenser R and therein cooled to 50° C. Therefrom, a non-condensed gas stream of 325.3 t/h was taken off, of which 15.8 t/h water, 309.4 t/h carbon dioxide and 4.9 kg/h ammonia, and also a condensate stream 10, of which a substream 11 of 36.9 t/h, of which 36.7 t/h were water, 139.7 kg/h carbon dioxide and 41.1 kg/h ammonia, was reapplied as reflux to the stripper D.

The remaining part of the condensate stream 10 was fed as stream 12, of 12.0 t/h, of which 11.9 t/h water, 45.4 t/h carbon dioxide and also 13.4 kg/h ammonia, was fed to an ammonia distillation column K having a diameter of 0.25 m and in total 10 theoretical plates which was operated at a pressure of 1.1 bar absolute, a temperature in the column bottom of 107° C. and, at the column top, of 102° C.

From the distillation column K, the overhead stream was taken off, cooled in a reflux condenser R to 50° C. and an ammonia-comprising stream 17 of 0.5 t/h was taken off, of which 490 kg/h were water, 29.6 kg/h carbon dioxide and 13.3 kg/h ammonia. The bottoms stream 18 from the column K was passed via the heat exchanger W and then recycled as back-stream to the absorber A as stream 4 of 11.5 t/h comprising water and about 20 ppm by weight of carbon dioxide and also about 20 ppm by weight of ammonia.

In the example method according to the invention, thus a pure gas having very low residue fractions of carbon dioxide, ammonia and prussic acid was obtained, it only being necessary for this to take off the stream 12 of 12.0 t/h from the method and feed it a column K for separating off ammonia. Via the stream 12, 13.4 kg/h of ammonia were ejected.

To eject the same mass stream of ammonia according to the conventional procedure, that is eject from the back-stream 3 to the absorber, in contrast, a substream of about 680 t/h of stream 3 which only comprises about 19 ppm by weight of ammonia must be ejected, that is a stream about 50 times greater compared with the inventive method.

The invention claimed is:

1. A method for removing acid gases and ammonia from a fluid stream comprising:
   an absorption step wherein the fluid stream comprising the acid gases and ammonia is brought into contact with an aqueous absorption medium, and the absorption step further comprises obtaining a fluid stream which is depleted of acid gases and ammonia, and also an absorption medium stream which is charged with acid gases and ammonia and
   a desorption step, wherein the acid gases and the ammonia are stripped out of the absorption medium and the condensable fractions thereof are condensed, and the desorption step further comprises obtaining a condensate and also a purified absorption medium stream,
   wherein the method further comprises ejecting in part or completely the condensate from the desorption step, or feeding it in part or completely to a distillation column in which ammonia is separated off overhead as aqueous solution or in the pure state and an aqueous bottom stream is obtained which is recycled to the absorption step or the desorption step.

2. The method according to claim 1, wherein the acid gases which are removed from the fluid stream are $CO_2$ and/or $H_2S$.

3. The method according to claim 2, wherein HCN is additionally removed from the fluid stream as acid gas.

4. The method according to claim 3, wherein the HCN is hydrolyzed upstream of the feed into the desorption step.

5. The method according to claim 4, wherein the hydrolysis of the HCN is performed in a dwell time vessel which is arranged between the absorption step and the desorption step.

6. The method according to claim 5, wherein the dwell time vessel is constructed as bottom of a flash apparatus.

7. The method according to claim 6, wherein the dwell time of the absorption medium stream loaded with acid gases and ammonia in the dwell time vessel (F) is between 5 and 40 min.

8. The method according to claim 1, wherein the purified absorption medium stream from the desorption step is cleaned by reclaiming from organic acids which are present in the fluid stream or which form in the absorption step or desorption step and is then recycled to the absorption step.

9. The method according to claim 8, wherein the reclaiming is performed thermally, via ion exchangers or by electrodialysis.

10. The method according to claim 1, wherein the desorption step is operated at elevated pressure in the range from 2.5 to 10 bar, $CO_2$ being obtained at elevated pressure which is then recycled to a reforming method.

11. The method according to claim 1, wherein the distillation for separating off ammonia is carried out in a multistage apparatus having a stripping section and enrichment section.

12. The method according to claim 11, wherein the multistage apparatus for separating off ammonia has 5 to 15 theoretical plates.

13. The method according to claim 12, wherein the multistage apparatus for separating off ammonia is operated at a pressure in the range from 1 to 20 bar absolute.

14. The method according to claim 7, wherein the dwell time of the absorption medium stream loaded with acid gases and ammonia in the dwell time vessel is between 10 and 30 min.

15. The method according to claim 14, wherein the dwell time of the absorption medium stream loaded with acid gases and ammonia in the dwell time vessel is between 15 and 25 min.

16. The method according to claim 10, wherein the desorption step is operated at elevated pressure in the range from 2.5 to 7 bar.

17. The method according to claim 16, wherein the desorption step is operated at elevated pressure in the range from 4 to 7 bar.

* * * * *